United States Patent [19]

Fremy

[11] Patent Number: 4,627,598

[45] Date of Patent: Dec. 9, 1986

[54] COUPLING DEVICE WITH ECCENTRICALLY-MOUNTED ROTARY VALVE ELEMENT

[76] Inventor: Raoul Fremy, Villa Emilia, 17 Rue Cecile Vallet, 92340 Bourg La Reine, France

[21] Appl. No.: 824,433

[22] Filed: Jan. 31, 1986

[51] Int. Cl.[4] .............................................. F16L 37/28
[52] U.S. Cl. ................................ 251/149.2; 251/149.6
[58] Field of Search .......................... 251/149.6, 149.2; 137/614.02, 614.03

[56] References Cited

U.S. PATENT DOCUMENTS

| | | | |
|---|---|---|---|
| 3,423,063 | 1/1969 | German | 251/149.9 |
| 3,618,092 | 11/1971 | Scivto, Jr. | 251/149.2 |
| 4,181,149 | 1/1980 | Cox | 251/149.2 |
| 4,445,664 | 5/1984 | Allrearl | 251/149.2 |

Primary Examiner—A. Michael Chambers
Attorney, Agent, or Firm—Sommer & Sommer

[57] ABSTRACT

A coupling device has a male section selectively insertable into a female section. At least one of the sections has a ball valve rotatably mounted within a housing. When one section is inserted into the other, the ball valve is constrained to rotate about an axis eccentric to the center of the ball from a flow-preventing position to a flow-permitting position.

15 Claims, 5 Drawing Figures

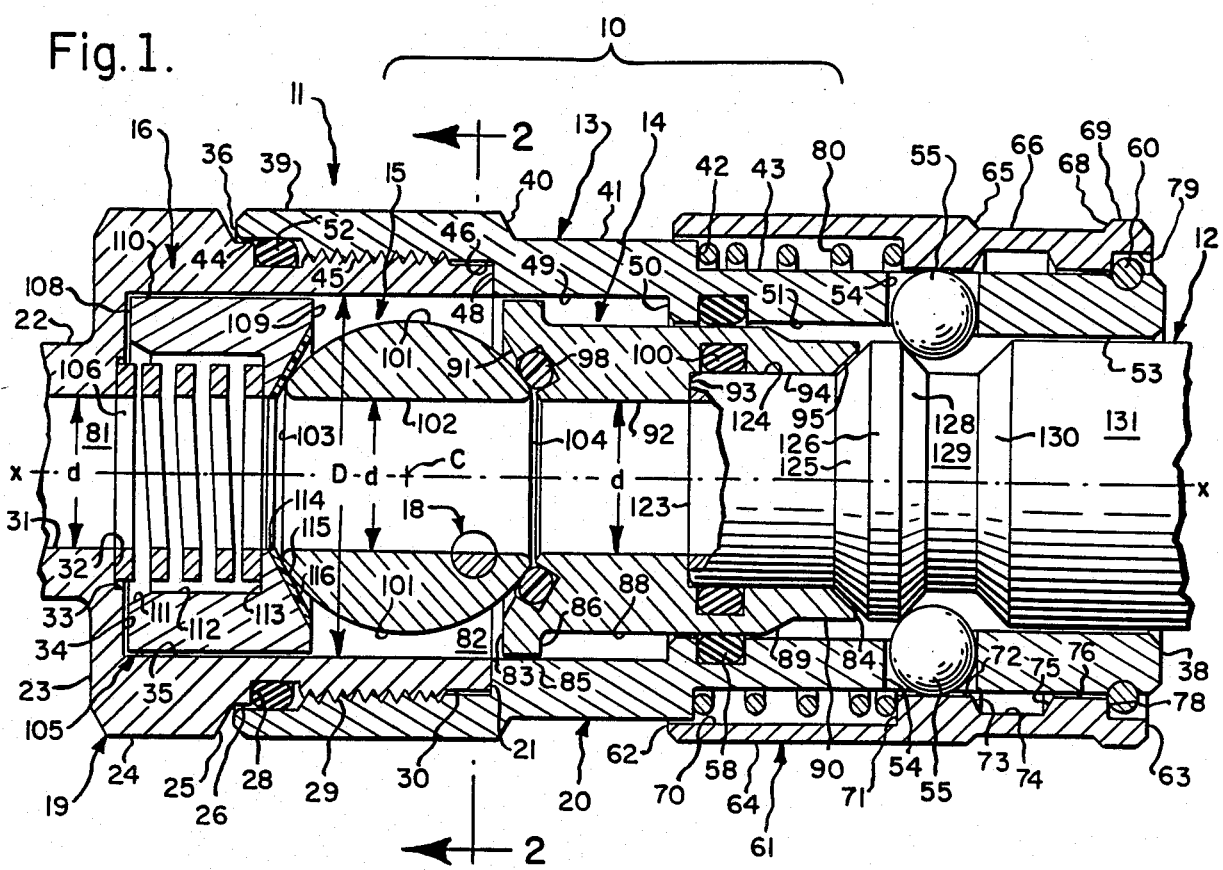

COUPLING DEVICE WITH ECCENTRICALLY-MOUNTED ROTARY VALVE ELEMENT

BACKGROUND OF THE INVENTION

1. Field of the Invention

The present invention relates generally to the field of fluid coupling devices for selectively establishing a flow passage, and, more particularly, to an improved quick-disconnect coupling device having a rotating valve element in at least one of the coupling sections.

2. Description of the Prior Art

Many forms of fluid coupling devices have, of course, been heretofore developed. Some of these are of the quick-disconnect type, which facilitates interlocking and separation of male and female coupling sections.

It is also known to provide one or both of the coupling sections with a rotary ball valve, and to provide a mechanism for automatically rotating this valve from a flow-preventing position to a flow-permitting position when the male section is selectively inserted into the female section. In some of these known devices, a pin engages the ball valve at a location eccentric to the ball's center of rotation, to cause the ball to rotate as it is moved axially along the housing. However, because the ball rotated about its own center, it was necessary to accommodate relative motion between the pin and ball during such rotation. Such relative motion was typically accommodated by permitting linear motion of the ball relative to the pin, or the pin relative to the housing. Such prior art devices are shown, for example, in applicant's prior U.S. Pat. No. 4,473,211, and in U.S. Pat. Nos. 4,445,664, 4,181,149, 3,423,061, 3,618,892, 3,078,068 and 3,279,497.

It is also known that such coupling devices may have a substantially constant diameter flow passage therethrough, when the valve has been rotated to its flow-permitting position, so as to minimize the pressure drop across the coupling device. This is indicated in U.S. Pat. No. 3,078,068, and in applicant's prior U.S. Pat. No. 4,473,211.

However, upon information and belief, in all such prior art devices, the ball valve was caused to rotate about its center. This required a relatively high ratio of axial displacement per increment of valve rotation.

SUMMARY OF THE INVENTION

The present invention provides a unique improvement for use in a coupling device having separable male and female sections, whether of the quick-disconnect type or otherwise.

The improvement is adapted to be incorporated into at least one of the coupling device sections, and broadly comprises: an elongated tubular housing (e.g., 13) having a flow passage therethrough, the flow passage having a conduit portion (e.g., 31) and having a chamber (e.g., 82) of enlarged diameter, the housing also having an abutment surface (e.g., 50) arranged to face into the chamber; an annular seat member (e.g., 14) arranged within the chamber for sliding movement therealong toward and away from the abutment surface, the inner surface of the seat member having a diameter (e.g., "d") substantially equal to the diameter of the housing conduit portion; a rotary valve element (e.g., 15) having a center (e.g., "C") and arranged within the housing chamber, the valve element having an outer surface (e.g., 101) continuously in engagement with the seat member and having a diametrical through-bore (e.g., 102) arranged such that the axis of the through-bore intersects the valve element center; biasing means (e.g., 16) continuously urging the valve element and seat member to move toward the abutment surface; and pivot means (e.g., 18) operatively arranged between the housing and the valve element for causing the valve element to rotate about a pivotal axis (e.g., axis y-y) transverse and eccentric to the valve element through-bore axis as the valve element moves axially along the chamber; whereby, as the valve element moves along the housing, the valve element will be caused to rotate about such eccentric pivotal axis between a flow-preventing position and a flow-permitting position.

Accordingly, the general object of this invention is to provide an improved fluid coupling device.

Another object is to provide an improved fluid coupling device of the self-sealing rotating ball-type.

Another object is to provide an improved fluid coupling device of the rotating ball-type, wherein the valve element automatically rotates from a flow-preventing position to a flow-permitting position as the coupling sections are joined together, and rotates back to the flow-preventing position when the sections are separated.

Still another object is to provide an improved fluid coupling device in which a valve element rotates about an axis which is both eccentric and transverse to the valve element through-bore.

These and other objects and advantages will become apparent from the foregoing and ongoing written specification, the drawings, and the appended claims.

BRIEF DESCRIPTION OF THE DRAWINGS

FIG. 1 is a fragmentary longitudinal vertical sectional view of an improved quick-disconnect coupling device, showing the rightward male section as having been axially inserted into the leftward female section, and also showing the ball valve as having been displaced leftwardly relative to the housing and rotated to its flow-permitting position.

FIG. 2 is a fragmentary transverse vertical sectional view thereof, taken generally on line 2—2 of FIG. 1, and showing the pivot pin in elevation.

DESCRIPTION OF THE PREFERRED EMBODIMENTS

Figure 3:
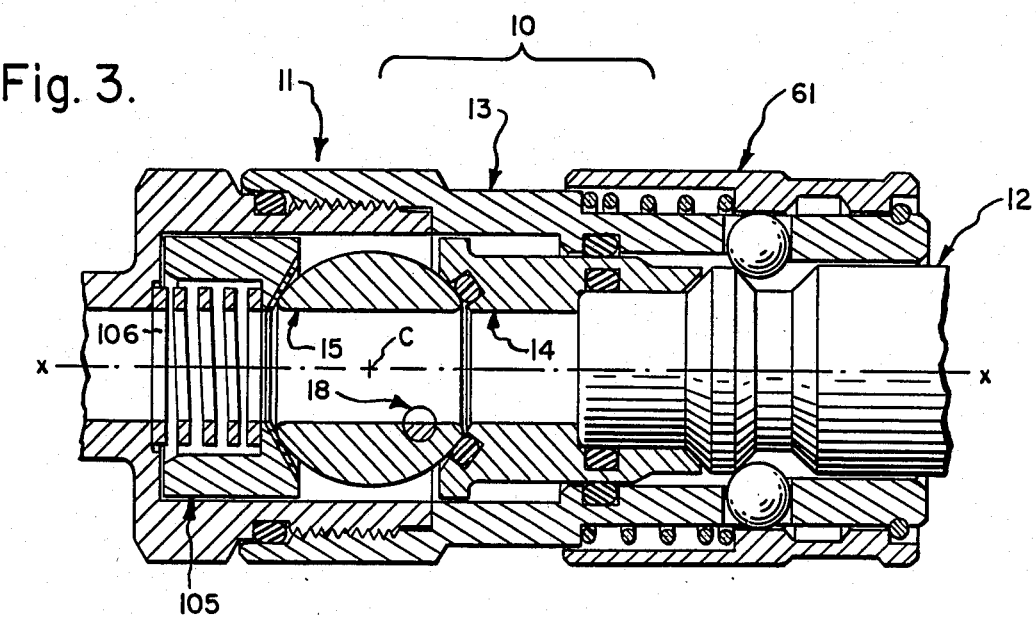
FIG. 3 is a fragmentary longitudinal vertical sectional view of the coupling device shown in FIG. 1, and showing the ball valve as being in its flow-permitting position when the inserted male section is locked into engagement with the female section.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. The drawings are intended to be read (e.g., cross-hatching, porportion, degree, arrangement of parts, etc.) together with the specification, and are to be considered a portion of the entire "written description" of this invention, as required by 35 U.S.C. § 112. Moreover, the drawings should generally be regarded as being to scale, unless otherwise indicated. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Unless otherwise indicated, the terms "inwardly" and "outwardly" refer to the orientation of a surface relative to its axis of elongation, or axis of rotation, as appropriate.

Referring now to the drawings, and more particularly to FIG. 1 thereof, this invention broadly provides an improved section or separable part of a fluid coupling device, of which the presently-preferred embodiment is generally indicated at 10. However, it should be clearly understood that the invention is not limited to usage in this particular type of coupling device, for this is only one possible species of structure defined by the generic claims. In any event, the preferred form of coupling device 10 is shown as being of the quick-disconnect type, and has a leftward female section 11 and a rightward male section 12 selectively interlockable with and separable therefrom. from. In the illustrated embodiment, the improvement is shown and described as being arranged within the female coupling section, and the cooperative male section has generally been shown in elevation. However, it should be clearly understood that the improvement may be incorporated into either or both sections, as desired.

Structure

In FIG. 1, the female coupling section 11, which incorporates the inventive improvement, is depicted as broadly including a horizontally-elongated tubular housing 13 having a fluid flow passage therethrough; an annular seat member 14 mounted for horizontal sliding movement within the housing; a rotary valve element 15 engaging the seat member; biasing means, generally indicated at 16, for urging the valve element and seat member to move rightwardly together; and pivot means, generally indicated at 18, operatively arranged between the valve element and the housing.

The housing 13 is shown as being of two-piece construction, and broadly includes a left part 19 and a right part 20. The housing left part 19 has a leftward tubular portion, an intermediate flange portion extending radially outwardly therefrom, and a rightward tubular portion of enlarged diameter. Specifically, the housing left part 19 has an annular vertical left face (not shown), and an annular vertical right face 21. Its outer surface sequentially includes (from left to right in FIG. 1): an outwardly-facing horizontal cylindrical surface 22; a leftwardly-facing annular vertical surface 23; a peripheral polygonal surface including a plurality of flats, severally indicated at 24; a rightwardly- and outwardly-facing frusto-conical surface 25; an outwardly-facing horizontal cylindrical surface 26, from which an annular groove 28 extends radially inwardly; an externally-threaded portion 29; and an outwardly-facing horizontal cylindrical surface 30 continuing rightwardly therefrom to join right end face 21. The inner surface of housing part 19 sequentially includes (from left to right in FIG. 1): an inwardly-facing horizontal cylindrical surface 31 extending rightwardly from the left end face (not shown); a rightwardly-facing annular vertical surface 32; a short inwardly-facing horizontal cylindrical surface 33; a rightwardly-facing annular vertical surface 34; and an inwardly-facing annular horizontal surface 35 continuing rightwardly therefrom to join right end face 21.

The housing right part 20 is shown as being in the form of a stepped tubular member having annular vertical left and right end faces 36,38, respectively. Part 20 has an outer surface which sequentially includes (from left to right in FIG. 1): a peripheral polygonal surface including a plurality of flats, severally indicated at 39, extending rightwardly from left end face 36; a rightwardly-and outwardly-facing frusto-conical surface 40; an outwardly-facing horizontal cylindrical surface 41; a rightwardly-facing annular vertical shoulder surface 42; and an outwardly-facing horizontal cylindrical surface 43 continuing rightwardly therefrom to join right end face 38. If desired, the juncture of surfaces 23,24, 24,25, 36,39 and 38,43 may be chamfered, as shown. The inner surface of the housing part 20 sequentially includes (from left to right in FIG. 1): an inwardly-facing horizontal cylindrical surface 44 extending rightwardly from left end face 36; an internally-threaded portion 45; an inwardly-facing horizontal cylindrical surface 46; a leftwardly-facing annular vertical surface 48; an inwardly-facing horizontal cylindrical surface 49; a leftwardly-facing annular vertical abutment surface 50; an inwardly-facing horizontal cylindrical surface 51; an inwardly- and leftwardly-facing frusto-conical surface (not shown); and an inwardly-facing horizontal cylindrical surface 53 continuing rightwardly therefrom to join right end face 38. A plurality of radial holes, severally indicated at 54, extend through the housing right part between outer surface 43 and inner surfaces 51,53. These holes accommodate a like plurality of balls, severally indicated at 55, which are used in the quick-disconnect feature of the improved coupling device. An annular groove extends radially into the housing right part from inner surface 51 to receive and accommodate an O-ring 58, which sealingly and wipingly engages the valve seat member 14. Adjacent its rightward end face 38, another annular groove extends radially into the housing right part from its outer surface 43, to receive and accommodate a retaining ring 60. Here again, this retaining ring is used in the quick-disconnect feature of the improved coupling device.

The left and right housing parts are joined together, as shown, such that threaded portions 29,45 thereof mate with one another, and left part end face 21 abuts right part shoulder surface 48. An O-ring 52 is operatively arranged in groove 28, and sealingly engages right part surface 44.

While collateral to the inventive improvement, the quick-disconnect feature of the improved coupling device includes a tubular sleeve, generally indicated at 61, surrounding the right marginal end portion of the housing. Sleeve 61 includes annular vertical left and right end faces 62,63, respectively. The outer surface of the sleeve sequentially includes (from left to right in FIG. 1): an outwardly-facing horizontal cylindrical surface 64 extending rightwardly from left end face 62; a rightwardly- and outwardly-facing frusto-conical surface 65; an outwardly-facing horizontal cylindrical surface 66; a leftwardly- and outwardly-facing frusto-conical surface 68; and an outwardly-facing horizontal cylindrical surface 69 continuing rightwardly therefrom to join right end face 63. The sleeve inner surface sequentially includes (from left to right in FIG. 1): an inwardly-facing horizontal cylindrical surface 70 extending rightwardly from left end face 62; a leftwardly-facing annular vertical surface 71; an inwardly-facing horizontal cylindrical surface 71; an inwardly- and rightwardly-facing frusto-conical surface 73; an inwardly-facing horizontal cylindrical surface 74; an inwardly- and leftwardly-facing frusto-conical surface 75; an inwardly-facing horizontal cylindrical surface 76; a rightwardly-facing annular vertical surface 78; and an inwardly-facing horizontal cylindrical surface 79 continuing rightwardly therefrom to join right end face 63. A coil spring 80 surrounds the housing and is arranged to act between housing surface 42 and sleeve surface 71. This spring continuously biases the sleeve to move rightwardly relative to the housing until sleeve surface 78 abuts retaining ring 60. However, in the conventional manner, the sleeve may be selectively shifted leftwardly relative to the housing to the position shown in FIG. 4, at which balls 55 may move radially outwardly into the annular internal sleeve groove defined by sleeve surfaces 73,74,75. Thus, when the sleeve is shifted leftwardly to the position shown in FIG. 4, the male section 12 may be either inserted or withdrawn from the female section 11. However, when the male section 12 is fully received in the female section 11, as shown in FIGS. 1 and 3, and the sleeve has returned to its normal rightward position, sleeve surface 72 will prevent such radial outward movement of balls 55, and will prevent the male section from being withdrawn from the female section. Thus, the flow passage through the female housing section has a conduit portion 81 of diameter "d", and has a radially-enlarged chamber 82 of diameter "D".

The seat member 14 is shown as being a specially-configured annular member or element. Specifically, the seat member has annular vertical left and right end faces 83,84, respectively. The seat member outer surface sequentially includes (from left to right in FIG. 1): an outwardly-facing horizontal cylindrical surface 85 extending rightwardly from left end face 83; a rightwardly-facing annular vertical surface 86; an outwardly-facing horizontal cylindrical surface 88; an outwardly- and rightwardly facing frusto-conical surface 89; and an outwardly-facing horizontal cylindrical surface 90 continuing rightwardly therefrom to join right end face 84. The inner surface of seat member 14 is sequentially includes (again from left to right in FIG. 1): an inwardly- and leftwardly-facing frusto-conical surface 91; an inwardly-facing horizontal cylindrical surface 92; a rightwardly-facing annular vertical surface 93; an inwardly-facing horizontal cylindrical surface 94; and an inwardly- and rightwardly-facing frusto-conical surface 95 continuing therefrom to join right end face 84. A leftward annular groove extends into the seat member normal to surface 91 to receive and accommodate an O-ring 98. Another rightward annular groove extends radially into the seat member from inner surface 94 to receive and accommodate another O-ring 100. O-ring 100 may, for example, be formed of rubber, or some other resilient material. However, O-ring 98, which continuously bears against the outer surface of the rotating valve element, is preferably formed of a low-friction material, such as polytetrafluoroethylene or the like, so as to minimize friction therebetween. Thus, the valve seat member 14 is slidably mounted within the tubular housing such that seat member surface 86 may move toward and away from housing abutment stop 50. Seat member internal surface 92 is also preferably of diameter "d".

The rotating valve element 15 is shown as being a spherical ball provided with a diametrical through-bore. Thus, the spherical ball has a center C, and has an outwardly-facing spherical surface 101. in FIG. 1, the through-bore is shown as being bounded by an inwardly-facing horizontal cylindrical surface 102, which opens onto outer surface 101 to form left and right circular vertical lines 103,104, respectively. Bore surface 102 is also indicated as being of diameter "d", and the center C of the ball is coincident with the horizontal axis x—x of the housing.

Figure 5:
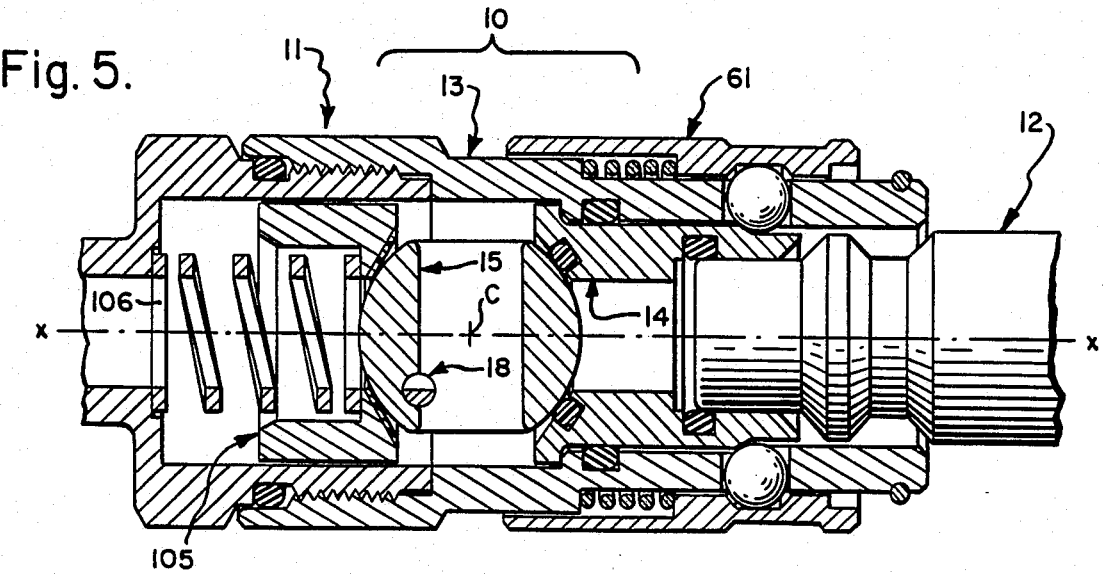
FIG. 5 is a view generally similar to FIG. 4, but showing the sleeve member as having been released and returned to its normal rightward position, showing the male section as having been further withdrawn from the female section, and showing the ball valve as having moved further rightwardly relative to the housing and as having been further rotated to its flow-preventing position.

The biasing means 16 are shown as including a bearing member 105, and a spring 106. The bearing member has annular vertical left and right end faces 108, 109, respectively, and has an outwardly-facing horizontal cylindrical surface 110 extending therebetween. The inner surface of the bearing member sequentially includes (from left to right in FIG. 1): an inwardly-and leftwardly-facing frusto-conical surface 111 extending from left face 108; an inwardly-facing horizontal cylindrical surface 112; a leftwardly-facing annular vertical surface 113; a short inwardly-facing horizontal cylindrical surface 114; and an inwardly- and rightwardly-facing frusto-conical surface 115 continuing therefrom to join right end face 109. A layer or thickness of low-friction material 116, such as polytetrafluoroethylene or the like, is applied or bonded to bearing member surface 115. This low-friction material bears against, and wipingly engages, the outer surface of the rotating valve element. Spring 106 is shown as being a conventional coil spring, and has its left end arranged to bear against housing surface 32. The right end of spring 106 acts against bearing member surface 113. Hence, this spring continuously urges the bearing member 105, the valve element 15, and the seat member 14 to move rightwardly along housing axis x—x, until seat member surface 86 engages housing abutment stop 50, as shown in FIG. 5. The convolutions of spring 106 are shown as having a rectangular transverse cross-section such that, when the valve element is in its flow-permitting position, as shown in FIGS. 1 and 3, the inwardly-facing surface of the tightly-compressed spring convolutions will simulate an inwardly-facing horizontal cylindrical surface of diameter "d".

Referring now to FIGS. 1 and 2, the pivot means 18 are shown as including a transverse horizontal hole 118 provided through the valve element, and a cylindrical pin 119. This pin has an intermediate portion of its longitudinal extent arranged in valve element hole 118, and has its marginal end portions extending therebeyond and received in aligned blind holes 120,120 provided in the housing. Valve element hole 118 is transverse to the axis of through-bore 102, which is shown to be horizontal in FIGS. 1–3, and is positioned eccentrically with respect to the through-bore axis and the center C of ball valve 15. In the preferred embodiment, hole 118 intersects valve bore surface 102. To accommodate this, the intermediate portion of the pin 119 is provided with a concave cylindrical surface 121 which aligns with bore surface 102 when the valve element is in its flow-permitting position, as shown in FIGS. 1-3. Suitable means, such as a flat 122 which engages a corresponding flat (not shown) in the housing hole 120, are provided to restrain the marginal end portions of pine 119 from moving axially relative to the housing, and from rotating relative to the housing. Such means for preventing both axial and rotative movement of the pin relative to the housing may take many different and varied forms. Thus, pin 119 is fixed to the housing, and valve element 15 is arranged to rotate about the eccentric axis y—y of this pin. In other words, if any portion of the valve element has a component of longitudinal movement relative to the housing, the valve element will also rotate about eccentric pin 119, and vice versa, rather than about its center C.

The coupling male section 12 is shown, in pertinent part, as having a leftwardly-extending nose, which is adapted to be selectively inserted into, and removed from, the open rightward end of the female section. Specifically, this male section nose is shown as having an annular vertical left face 123. This nose also has an outer surface which sequentially includes (from left to right in FIG. 1): an outwardly-facing horizontal cylindrical surface 124 extending rightwardly from end face 123 and sealingly engaged by O-ring 100; an outwardly- and leftwardly-facing frusto-conical surface 125; an outwardly-facing horizontal cylindrical surface 126; an outwardly- and rightwardly-facing frusto-conical surface 128, an outwardly-facing horizontal cylindrical surface 129; an outwardly- and leftwardly-facing frusto-conical surface 130; and an outwardly-facing horizontal cylindrical surface 131 continuing rightwardly therefrom. Surfaces 128,129,130 form an annular groove which extends into the male section, which groove is adapted to receive the several balls 55 of the quick-disconnect coupling connection between the male and female sections. Thus, the nose of the male section may be inserted into the open rightward end of the female section, with male section end face 123 engaging seat member surface 93. Continued insertion of the male section 12 will displace the seat member, the valve element and the bearing member leftwardly until bearing member left end face 108 abuts housing surface 34.

Operation

Figure 4:
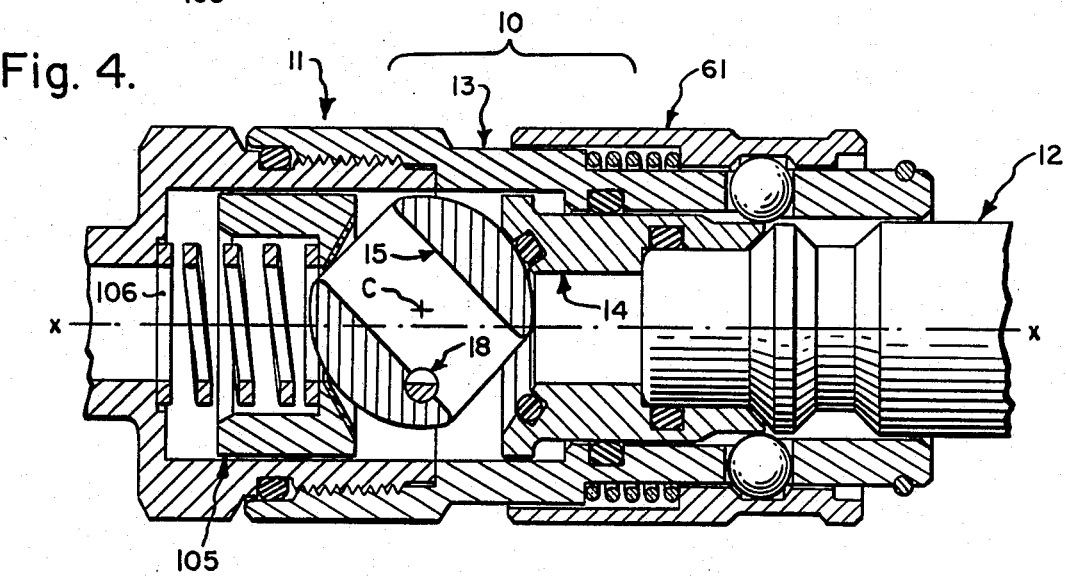
FIG. 4 is a view generally similar to FIG. 3, but showing the outer sleeve as having been temporarily shifted leftwardly relative to the housing to permit separation of the male section, showing the male section as having been partially withdrawn from the female section, and further showing the ball valve as having been displaced rightwardly relative to the housing from the position shown in FIG. 3, and as being in a rotational position intermediate its extreme flow-permitting and flow-preventing positions.

The operation of the improved female coupling device section is comparatively illustrated in FIGS. 3-5.

Initially, it is pointed out that the nose of the male section may be inserted into the open rightward end of the female section, such that male section end face 123 abuts seat member surface 93. Thereafter, continued insertion (i.e., displacement in the leftward direction) of the male member will move seat member 14 leftwardly, such that seat member surface 86 will move away from housing abutment stop 50. When this occurs, the ball moves both axially and rotatably relative to the housing, and displaces the bearing member 105 leftwardly, compressing spring 106, until bearing member left end face 108 abuts housing surface 34. Balls 55 engage male section surface 128, and prevent unintended separation of the male section from the female section. In this initial condition, it will be noted that the valve element bore 102 is horizontally aligned with housing conduit surface 31 and seat member inner surface 92, thereby establishing a substantially constant diameter flow passage through the female section. Of course, such flow passage may be continued through the male section, as shown, if desired. Thus, the valve element 15 is shown as being in its flow-permitting position in FIGS. 1-3.

Referring now comparatively to FIGS. 3 and 4, to release the male section, sleeve 61 is first shifted leftwardly relative to the body, such that balls 55 may move radially outwardly into the groove defined by sleeve surfaces 73,74,75, as shown in FIG. 4. When the balls 55 have so moved radially outwardly, the male coupling section may be displaced rightwardly. As this occurs, spring 106 will expand to maintain bearing member 105 in continuous contact with the outer surface of the valve element. The valve element begins to rotate about eccentric pivot pin 119, and such rotation of the valve element displaces the seat member rightwardly such that seat member surface 86 will move toward housing abutment stop 50. Thus, FIG. 4 shows the valve element as being in a rotational position intermediate its extreme flow-permitting position (as shown in FIG. 3) and its extreme flow-preventing position (as shown in FIG. 5).

Referring now comparatively to FIGS. 4 and 5, after the male member lug, defined by surfaces 125,126,128, has moved rightwardly of balls 55, sleeve 61 may be released. However, the inwardly-moving balls will now engage seat member surface 90. Thus, the male member may be withdrawn, and spring 106 will continue to expand to urge bearing member 105 to move further rightwardly. Such motion of the bearing member further rotates valve element 15 about eccentric pin 119 to the flow-preventing position shown in FIG. 5. Such rotation of the valve member about the eccentric axis of pin 119 produces rightward axial displacement of the seat member 14 until seat member surface 86 engages housing abutment surface 50. If the male sectin is inserted into the female section, the above-described operation is reversed.

Modifications

It should be noted that the valve element is continuously engaged by, and captured between, bearing member 105 and by seat member 14. In this regard, bearing member coating 116 and seat member O-ring 98 are both preferably formed of a low-friction material, such as polytetrafluoroethylene, to minimize friction between the relatively-moving parts. However, this particular choice of material is not deemed critical and, while preferred may be readily changed or modified. The various other O-rings of the assembly may be formed of a conventional resilient material, all as desired. The shape of the various parts and components may readily be changed, as desired. For example, spring 106 could be of enalrged inside diameter, and a tube arranged therewithin to provide an imperforate flow-guiding surface within the spring. Alternatively, the bearing member could have an imperforate surface defining such flow-guiding passage. The materials of construction of the various elements are not deemed to be particularly critical, and may be readily changed or varied depending upon the size and configuration of the coupling device and the serviced fluid(s). The rotary valve element need not be a spherical ball, and may alternatively be in the form of a cylinder or shell having a spherical or cyliindrical outer surface portion.

The location of the eccentric pin 119 may be changed or modified, as desired. The location of pin 119 is determined, in part, by the amount of axial displacement needed to accommodate insertion and removal of the male section, and by the amount of rotation needed to displace the ball between its flow-permitting and flow-preventing position. Thus, while in the preferred embodiment, the ball rotates through an angle of 90° to displace the ball through-bore between its horizontal flow-permitting position and its vertical flow-preventing position, such angle and the arc distance inscribed thereby are not invariable. Indeed, hole 118 may intersect bore surface 102, as shown, but this may be changed. Moreover, it is not necessry that the pivot pin 119 extend completely through the valve element. For exmaple, two aligned stud-like pivot pins (not shown) could have their inner marginal end portions received in blind holes (not shown) provided in the valve element, rather than having a single pin penetrate a throughhole. The biasing means may also take many forms. For example, it may be possible for spring 106, or an equivalent, to directly engage the valve element, without the presence of an intermediate bearing member.

Another feature of mounting the ball for rotation about an eccentric pivot pin is that this arrangement allows for amplified angular displacement of the ball surface per unit of axial displacement along the housing. In earlier devices wherein the ball rotated about its own center, such ratio was 1:1. In other words, an axial displacement of one unit caused a point on the surface of the ball to move through a like arc distance of one unit. However, by mounting the ball of rotation about an eccentric axis, ratios greater than 1:1 may be obtained. This amplified ratio is determined by the arm distance between the axis of the eccentric pin and the center of the ball. For example, in the illustrated embodiment, the valve element rotates through an arc of 90° as it moves axially relative to the housing from the position shown in FIG. 3 to the position shown in FIG. 5. If the ball diameter measures, say, 52 mm in FIG. 1, the circumference of the ball may be calculated to be about 163.43 mm. Since the ball moves through an arc of 90° between its flow-permitting and flow-preventing positions, the arc distance traveled by a point on the surface of the ball during such movement will be one-quarter of its circumference, or about 40.86 mm. To produce this magnitude of angular displacement, the ball must move axially from the position shown in FIG. 3 to the position shown in FIG. 5. If the axial distance between surfaces 50,86 measures, say, 21.5 mm, in FIG. 1, this means that a point on the surface of the ball valve will rotate through an arc distance of 40.86 mm when the ball moves horizontally for a distance of 21.5 mm. Hence, in this illustration, the ratio of ball surface rotation per unit of axial displacement is 40.86/21.5=1.90. However, it should be understood that this calculation is only exemplary, and is not intended to limit the scope of the claims. The significance of such amplified motion is that it permits the improvement to be contained within a more axially-compact housing.

Therefore, while the presently-preferred embodiment of the improved coupling device section has been shown and described, and various possible changes and modifications thereof discussed, persons skilled in this art will readily appreciate that various additional changes and modifications may be made without departing from the spirit of the invention, as defined and differentiated by the following claims.

What is claimed is:

1. A coupling device section, comprising:
   an elongated tubular housing having a flow passage therethrough, said flow passage having a conduit portion and having an enlarged chamber, said housing also having an abutment surface arranged to face into said chamber;
   an annular seat member arranged within said chamber for sliding movement therealong toward and away from said abutment surface, the inner surface of said seat member having a diameter substantially equal to the diameter of said conduit portion;
   a rotary valve element having a center and arranged within said chamber, said valve element having an outer surface continuously in engagement with said seat member and having a through-bore arranged such that the axis of said through-bore intersects said valve element center;
   biasing means continuously urging said valve element and seat member to move toward said abutment surface; and
   pivot means operatively arranged between said housing and said valve element for causing said valve element to rotate about a pivotal axis transverse and eccentric to said bore axis as said valve element moves along said chamber;
   whereby, as said valve element moves along said housing, said valve element will be caused to rotate about said pivotal axis between a flow-preventing position and a flow-permitting position.

2. A coupling device section as set forth in claim 1 wherein said through-bore has a diameter substantially equal to the diameter of said conduit portion.

3. A coupling device section as set forth in claim 1 wherein, when said seat member engages said abutment surface, said valve element is in a rotational position to prevent flow through said passageway.

4. A coupling device section as set forth in claim 1 wherein said pivot means includes at least one hole provided in said valve element and at least one pin having an inner portion arranged within said hole and having an outer portion extending beyond said valve element and engaging said housing.

5. A coupling device section as set forth in claim 4 wherein each pin outer portion is restrained against axial movement along said housing.

6. A coupling device section as set forth in claim 5 wherein each pin outer portion is also restrained against rotational movement relative to said housing.

7. A couping device section as set forth in claim 6 wherein said valve element is rotatably mounted on each pin.

8. A coupling device section as set forth in claim 4 wherein said hole extends through said valve element.

9. A coupling device section as set forth in claim 8 wherein said pin has an intermediate portion arranged in said hole and has marginal end portions extending beyond said valve element and engaging said housing.

10. A coupling device section as set forth in claim 9 wherein said marginal end portions are restrained against axial movement along said housing.

11. A coupling device section as set forth in claim 10 wherein said marginal end portions are also restrained against rotational movement relative to said housing.

12. A coupling device section as set forth in claim 11 wherein said hole intersects said valve element through-bore.

13. A coupling device section as set forth in claim 12 wherein said intermediate portion has a concave surface configured to the shape of said bore surface.

14. A coupling device section as set forth in claim 1 wherein said biasing means includes a bearing member arranged in said chamber and having a surface arranged to bear continuously against said valve element outer surface, and a spring arranged to act between said housing and said bearing member.

15. A coupling device section as set forth in claim 1 wherein a portion of said valve element outer surface is configured as a spherical segment.

* * * * *